United States Patent
Apte et al.

(10) Patent No.: US 12,423,241 B1
(45) Date of Patent: Sep. 23, 2025

(54) SHADOW TAG MANAGEMENT FOR ACCELERATOR PARTITIONS

(71) Applicant: Advanced Micro Devices, Inc., Santa Clara, CA (US)

(72) Inventors: Amit P. Apte, Austin, TX (US); Bryan P. Broussard, Austin, TX (US); Vydhyanathan Kalyanasundharam, Santa Clara, CA (US); Ganesh Balakrishnan, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 97 days.

(21) Appl. No.: 18/090,251

(22) Filed: Dec. 28, 2022

(51) Int. Cl.
*G06F 12/08* (2016.01)
*G06F 12/0846* (2016.01)

(52) U.S. Cl.
CPC .. *G06F 12/0851* (2013.01); *G06F 2212/1016* (2013.01)

(58) Field of Classification Search
CPC ............... G06F 12/08; G06F 12/0851; G06F 2212/1016
See application file for complete search history.

(56) References Cited

U.S. PATENT DOCUMENTS

| | | | | |
|---|---|---|---|---|
| 12,306,754 B2* | 5/2025 | Kotra | | G06F 12/0802 |
| 2011/0072190 A1* | 3/2011 | Borracini | | G06F 12/0246 |
| | | | | 711/E12.001 |
| 2013/0145096 A1* | 6/2013 | Li | | G06F 16/2308 |
| | | | | 711/127 |
| 2014/0006898 A1* | 1/2014 | Sharon | | G06F 12/0246 |
| | | | | 714/755 |
| 2017/0371786 A1* | 12/2017 | Srinivasan | | G06F 12/0846 |
| 2018/0239709 A1* | 8/2018 | Zaykov | | G06F 12/0851 |
| 2019/0324912 A1* | 10/2019 | Toivanen | | G06F 12/084 |
| 2020/0104164 A1* | 4/2020 | Pawlowski | | G06F 9/3824 |
| 2022/0414004 A1* | 12/2022 | Brewer | | G06F 12/0607 |
| 2023/0251894 A1* | 8/2023 | Brewer | | G06F 9/466 |
| | | | | 345/76 |
| 2023/0297440 A1* | 9/2023 | Cowperthwaite | | G06F 9/5016 |
| | | | | 718/104 |

(Continued)

FOREIGN PATENT DOCUMENTS

| | | | | |
|---|---|---|---|---|
| EP | 848331 A1 * | 6/1998 | | G06F 12/0851 |
| WO | WO-2011126893 A2 * | 10/2011 | | G06F 13/385 |

OTHER PUBLICATIONS

M. Thapar, "Interleaved dual tag directory scheme for cache coherence," 1994 Proceedings of the Twenty-Seventh Hawaii International Conference on System Sciences, Wailea, HI, USA, 1994, pp. 546-553.*

(Continued)

*Primary Examiner* — Pierre Michel Bataille
(74) *Attorney, Agent, or Firm* — Greenberg Traurig, LLP

(57) ABSTRACT

The disclosed computer-implemented method includes interleaving a plurality of caches corresponding to a plurality of chiplets, identifying a source chiplet ID of a memory request of a new address for the interleaved caches, and storing, using an indexing scheme that incorporates the source chiplet ID, a shadow tag for a cache of the interleaved caches corresponding to the memory request. Various other methods, systems, and computer-readable media are also disclosed.

20 Claims, 5 Drawing Sheets

(56) References Cited

U.S. PATENT DOCUMENTS

| | | | |
|---|---|---|---|
| 2023/0298128 A1* | 9/2023 | Puffer | G06T 1/60 345/520 |
| 2024/0202116 A1* | 6/2024 | Kotra | G06F 12/0897 |
| 2025/0028643 A1* | 1/2025 | Sutardja | G06F 12/10 |

OTHER PUBLICATIONS

J. H. Ryoo, M. R. Meswani, A. Prodromou and L. K. John, "SILC-FM: Subblocked InterLeaved Cache-Like Flat Memory Organization," 2017 IEEE International Symposium on High Performance Computer Architecture (HPCA), Austin, TX, USA, 2017, pp. 349-360.*

\* cited by examiner

SHADOW TAG MANAGEMENT FOR ACCELERATOR PARTITIONS

BACKGROUND

Some graphics processing unit (GPU) and/or accelerator hardware architectures utilize multiple partitions or chiplets. For example, an accelerator architecture can include multiple chiplets rather than a single larger processing unit. Chiplet architectures allow different types of architectures by mixing chiplet designs as well as improve manufacturing yields due to the smaller sizes of chiplets. Some architectures allow interleaving chiplets such that multiple chiplets can behave as a single processing unit. As chiplets often include caches, the interleaved chiplets can also interleave their respective caches, which can behave as a single, larger cache.

BRIEF DESCRIPTION OF THE DRAWINGS

The accompanying drawings illustrate a number of exemplary implementations and are a part of the specification. Together with the following description, these drawings demonstrate and explain various principles of the present disclosure.

FIGS. 3A-C are simplified diagrams of exemplary cache interleaving combinations.

Figure 1:
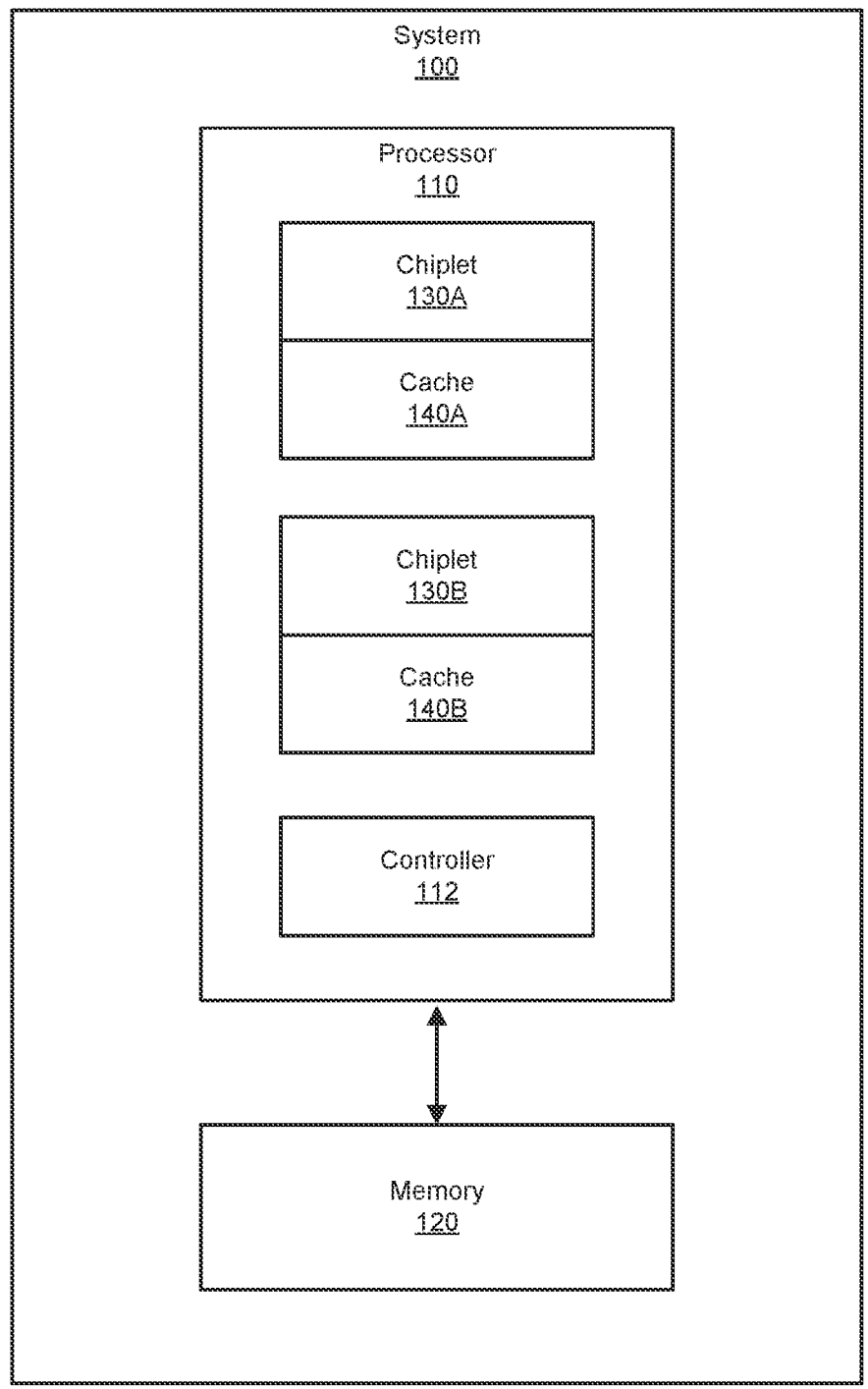
FIG. 1 is a block diagram of an exemplary system for shadow tag management for accelerator partitions.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

The present disclosure is generally directed to shadow tag management for accelerator partitions. As will be explained in greater detail below, implementations of the present disclosure provide for interleaving caches for interleaved chiplets and storing shadow tags of memory requests for new addresses for the interleaved caches using an indexing scheme that incorporates source chiplet IDs. Depending on the number of chiplets, different combinations of chiplets, and accordingly different combinations of caches, can be interleaved. The indexing scheme described herein is advantageously flexible for to support the different combinations without requiring additional storage for the interleaved cache shadow tags. Accordingly, the systems and methods described herein improve the functioning of the computer itself by efficiently managing shadow tags for different combinations of interleaving chiplets/caches without increasing storage requirements.

As will be described in greater detail below, the instant disclosure describes various systems and methods for shadow tag management for chiplet caches. By identifying a source chiplet ID of a memory request for a new address requiring a new shadow tag, the source chiplet ID can be incorporated into the new shadow tag. Incorporating the source chiplet ID can avoid requiring additional address bits by repurposing bits even as the number of interleaved caches change.

In one example, a device for shadow tag management for accelerator partitions includes a plurality of chiplets, each chiplet having a cache, and a controller configured to interleave a plurality of caches corresponding to a plurality of chiplets, identify a source chiplet ID of a memory request of a new address for the interleaved caches, and store, using an indexing scheme that incorporates the source chiplet ID, a shadow tag associated with a cache of the interleaved caches corresponding to the memory request.

In some examples, the indexing scheme repurposes one or more address bits based on a number of interleaved caches. In some examples, a number of repurposed bits is based on the number of interleaved caches. In some examples, the indexing scheme repurposes at least one static address bit. In some examples, a number of static address bits is based on a number of interleaved caches. In some examples, the number of static address bits corresponds to a number of repurposed bits.

In some examples, the indexing scheme further incorporates a channel ID for the interleaved caches. In some examples, the indexing scheme further incorporates a stack ID for the interleaved caches. In some examples, the indexing scheme further incorporates a die ID for the interleaved caches.

In one implementation, a system for shadow tag management for accelerator partitions includes a plurality of chiplets, each chiplet having a cache and a controller configured to interleave one or more of the plurality of chiplets and interleave corresponding caches, identify a source chiplet ID of a memory request of a new address for the interleaved caches, and store, using an indexing scheme that repurposes one or more address bits to incorporate the source chiplet ID, a shadow tag for a cache of the interleaved caches corresponding to the memory request.

In some examples, a number of repurposed bits is based on a number of interleaved caches. In some examples, the indexing scheme repurposes at least one static address bit. In some examples, a number of static address bits is based on a number of interleaved caches. In some examples, the number of static address bits corresponds to a number of repurposed bits. In some examples, the indexing scheme further incorporates at least one of a channel ID for the interleaved caches, a stack ID for the interleaved caches, or a die ID for the interleaved caches.

In one implementation, a method for shadow tag management for accelerator partitions includes interleaving one or more of the plurality of chiplets and interleaving corresponding caches, identifying a source chiplet ID of a memory request of a new address for the interleaved caches, and storing, using an indexing scheme that repurposes at least one static address bit to incorporate the source chiplet ID, a shadow tag for a cache of the interleaved caches corresponding to the memory request.

In some examples, the indexing scheme repurposes one or more address bits based on a number of interleaved caches. In some examples, a number of repurposed bits is based on the number of interleaved caches. In some examples, a number of static address bits is based on a number of interleaved caches. In some examples, the indexing scheme further incorporates at least one of a channel ID for the interleaved caches, a stack ID for the interleaved caches, or a die ID for the interleaved caches.

Features from any of the implementations described herein can be used in combination with one another in accordance with the general principles described herein. These and other implementations, features, and advantages will be more fully understood upon reading the following detailed description in conjunction with the accompanying drawings and claims.

The following will provide, with reference to FIGS. 1-5, detailed descriptions of shadow tag management for accelerator partitions. Detailed descriptions of example systems for accelerator partitions (e.g., chiplets and corresponding caches) will be provided in connection with FIGS. 1 and 2. Detailed descriptions of example cache interleaving will be provided in connection with FIG. 3. Detailed descriptions of an example indexing scheme will be provided in connection with FIG. 4. Detailed descriptions of corresponding computer-implemented methods will also be provided in connection with FIG. 5.

FIG. 1 is a block diagram of an example system 100 for accelerator partitions. System 100 corresponds to a computing device, such as a desktop computer, a laptop computer, a server, a tablet device, a mobile device, a smartphone, a wearable device, an augmented reality device, a virtual reality device, a network device, and/or an electronic device. As illustrated in FIG. 1, system 100 includes one or more memory devices, such as memory 120. Memory 120 generally represents any type or form of volatile or non-volatile storage device or medium capable of storing data and/or computer-readable instructions. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 includes one or more physical processors, such as processor 110. Processor 110 generally represents any type or form of hardware-implemented processing unit capable of interpreting and/or executing computer-readable instructions. In some examples, processor 110 accesses and/or modifies data and/or instructions stored in memory 120. Examples of processor 110 include, without limitation, microprocessors, microcontrollers, Central Processing Units (CPUs), graphics processing units (GPUs), Field-Programmable Gate Arrays (FPGAs) that implement softcore processors, Application-Specific Integrated Circuits (ASICs), systems on chip (SoCs), digital signal processors (DSPs), Neural Network Engines (NNEs), accelerators, graphics processing units (GPUs), portions of one or more of the same, variations or combinations of one or more of the same, and/or any other suitable physical processor.

As further illustrated in FIG. 1, processor 110 includes at least a chiplet 130A and a chiplet 130B along with a controller 112. Chiplet 130A includes a corresponding cache 140A and chiplet 130B includes a corresponding cache 140B. Chiplets 130A and 130B represent accelerator partitions and/or processing cores that can each function independently (e.g., each performing specific processing functions), or can be interleaved into a combined processing unit. Caches 140A and 140B represent fast on-die memory for chiplets 130A and 130B, respectively, for temporarily holding data to reduce expensive memory accesses to memory 120. Although not shown in FIG. 1, caches 140A and 140B can be part of a cache hierarchy. When chiplets 130A and 130B are interleaved, caches 140A and 140B can also be interleaved.

Controller 112 represents a control circuit that can coordinate chiplets 130A and 130B and caches 140A and 140B, for example by coordinating interleaving. In some examples, controller 112 further coordinates memory requests (e.g., with caches 140A and 140B and/or memory 120). In some examples, controller 112 further manages shadow tags and can include storage for the shadow tags.

Shadow tags are used for tracking and storing information on caches, such as address and state information. When managing a cache hierarchy, probes are sent to maintain coherency between caches (e.g., to prevent stale cached data from being operated on). Because the probes themselves create overhead, probe filters are used to reduce probe traffic by filtering out probes from reaching irrelevant caches. Shadow tags can help with probe filters by tracking which addresses are in a given cache along with other state information. In some implementations, shadow tags are shadows (e.g., identical or near-identical copies with respect to information) of the tags in a cache.

Figure 2:
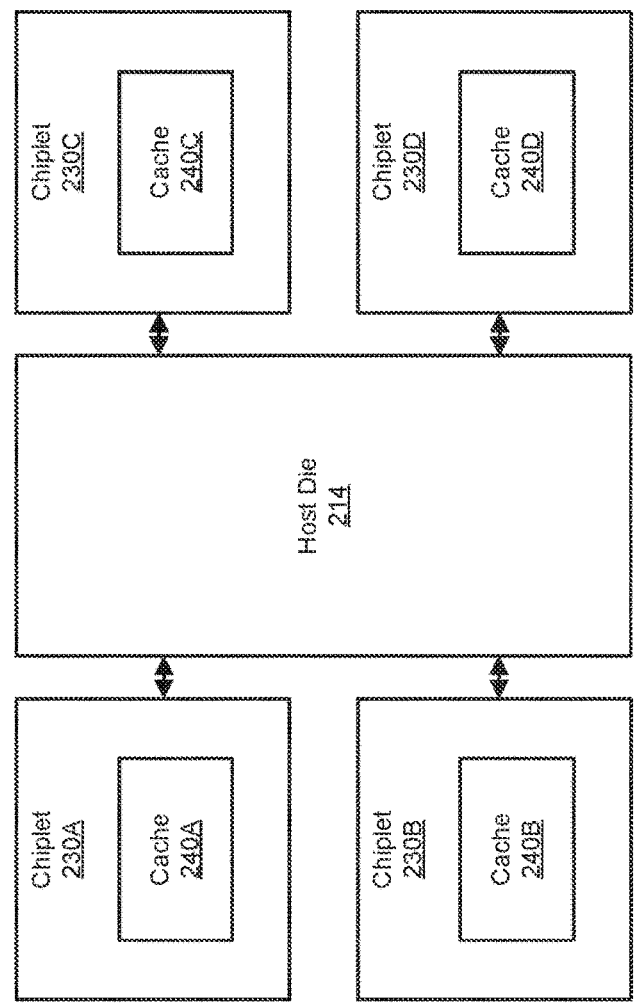
FIG. 2 is a simplified diagram of an exemplary accelerator architecture.

FIG. 2 illustrates an example accelerator 210 corresponding to processor 110. As shown in FIG. 2, accelerator 210 includes a host die 214 which in some examples corresponds to and/or incorporates controller 112. Accelerator 210 also includes a chiplet 230A which corresponds to chiplet 130A and/or chiplet 130B, a chiplet 230B which corresponds to chiplet 130A and/or chiplet 130B, a chiplet 230C which corresponds to chiplet 130A and/or chiplet 130B, and a chiplet 230D which corresponds to chiplet 130A and/or chiplet 130B. Each chiplet includes a corresponding cache, namely chiplet 230A includes a cache 240A which corresponds to cache 140A and/or cache 140B, chiplet 230B includes a cache 240B which corresponds to cache 140A and/or cache 140B, chiplet 230C includes a cache 240C which corresponds to cache 140A and/or cache 140B, and chiplet 230D includes a cache 240D which corresponds to cache 140A and/or cache 140B.

Host die 214 represents an input/output die (IOD) that can coordinate communication between the chiplets as well as communication with off-die components such as a memory (e.g., memory 120). In some examples, host die 214 and/or a controller therein can coordinate interleaving of the chiplets. For example, chiplet 230A and chiplet 230B can be interleaved into a larger processing unit and chiplet 230C can be interleaved with chiplet 230D. The corresponding caches can also be interleaved (e.g., cache 240A interleaved with cache 240B, and cache 240C interleaved with cache 240D). As will be explained further below, interleaving caches allows the interleaved caches to be used as a single, larger cache. Interleaving caches can improve performance, for example by reducing hot spots by spreading out memory accesses physically between the caches, rather than consolidating memory accesses into an individual cache until the individual cache is full.

However, interleaving caches requires updating shadow tag indexing. Because the interleaved cache is larger (e.g., able to manage more entries) than any individual cache, using the original indexing scheme would require additional bits, further requiring additional storage. The indexing scheme described herein repurposes address bits to avoid requiring additional bits, as will be described further below.

Figures 3A, 3B, 3C:
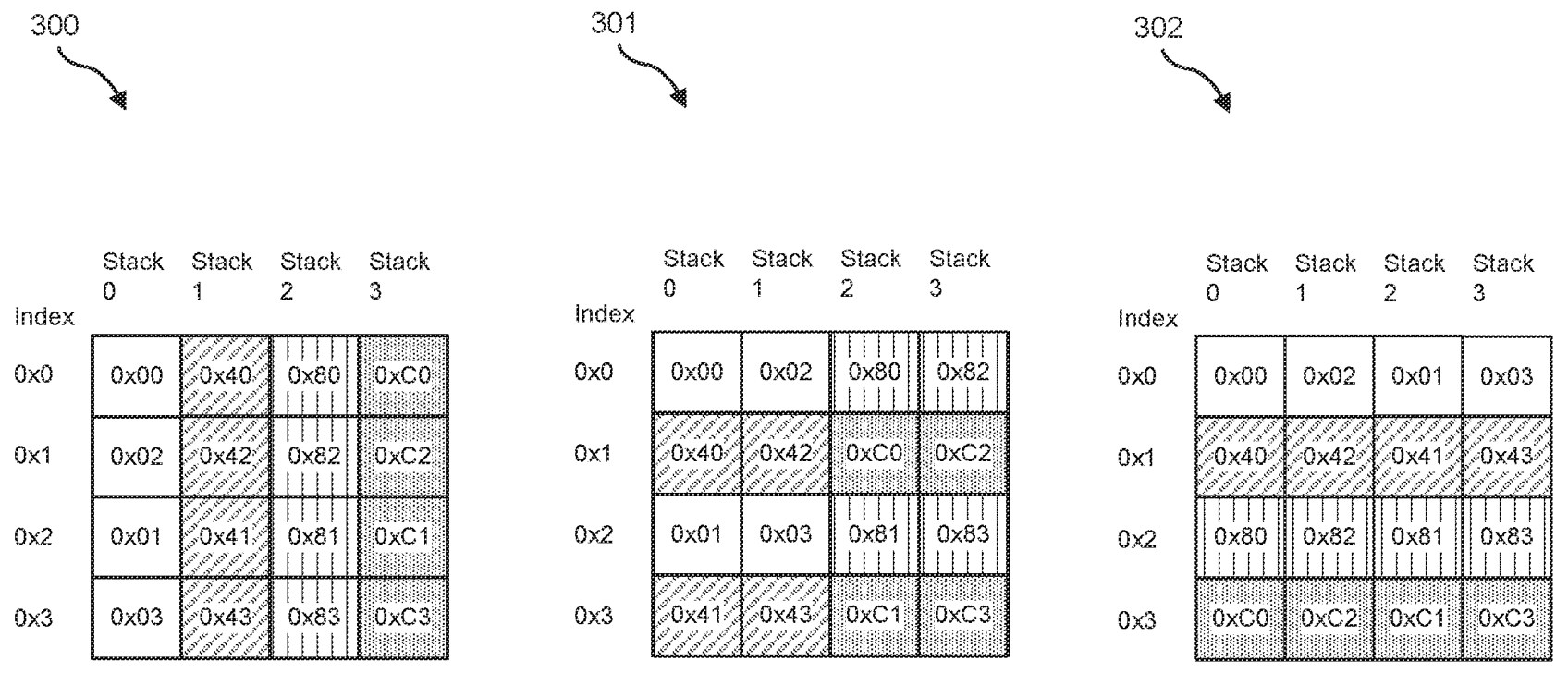

Although FIG. 2 illustrates four chiplets, in other examples accelerator 210 can include additional chiplets. Moreover, in other examples accelerator 210 can interleave various other combinations of chiplets, including larger groups of interleaved chiplets, differently sized groups of interleaved chiplets, etc. FIGS. 3A-3C illustrate how shadow tags can be re-interpreted based on cache interleaving. In addition, although the implementations described herein refer to combining caches (e.g., 2 caches, 4 caches, etc.), in other implementations, cache interleaving can be referred with respect to cache regions per socket (e.g., 1 cache region per socket corresponding to interleaving all caches into one cache region, 2 cache regions per socket referring to dividing the caches into two interleaved cache regions, etc.)

FIGS. 3A-3C illustrate diagrams 300, 301, and 302, respectively, of shadow tag indexes for various interleaving combinations for four caches (e.g., as in FIG. 2). More specifically, FIGS. 3A-3C illustrate how the address values can spread across physical stacks of each cache. FIG. 3A illustrates an example of no cache interleaving, which in some examples also corresponds to physical addresses. In FIG. 3A, the address ranges follow the stacks (further indicated by shading).

FIG. 3B illustrates an example of interleaving two caches (e.g., into two cache regions each comprising two interleaved caches). As illustrated in FIG. 3B, the address ranges are spread across the interleaved caches. For example, address ranges are spread across stack 0 and stack 1, and address ranges are spread across stack 2 and stack 3.

FIG. 3C illustrates an example of interleaving four caches (e.g., into one cache region comprising four interleaved caches). As illustrated in FIG. 3C, the address ranges are spread across all four stacks. Although FIGS. 3A-3C correspond to interleaving combinations of four caches, in other examples including more caches, the interleaving of address ranges accordingly scale.

Figure 4:
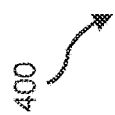
FIG. 4 is a diagram of an exemplary indexing scheme.

FIG. 4 illustrates an indexing scheme 400 of how address bits can be repurposed. As the number of interleaved caches increase (e.g., from 1 to 2 to 4 in FIG. 4), a number of static address bits also increase. The indexing scheme can take advantage of the static address bits by replacing them with source chiplet ID bits, which provide better utilization. Swapping static bits with bits that change allows repurposing entries that otherwise would have been wasted. In some examples, a source chiplet ID can include various identifying bits, such as a stack ID, a die ID, and/or a channel ID. As shown in FIG. 4, as the number of interleaved caches increase, additional bits (e.g., static address bits) can be replaced with source chiplet ID bits.

Figure 5:
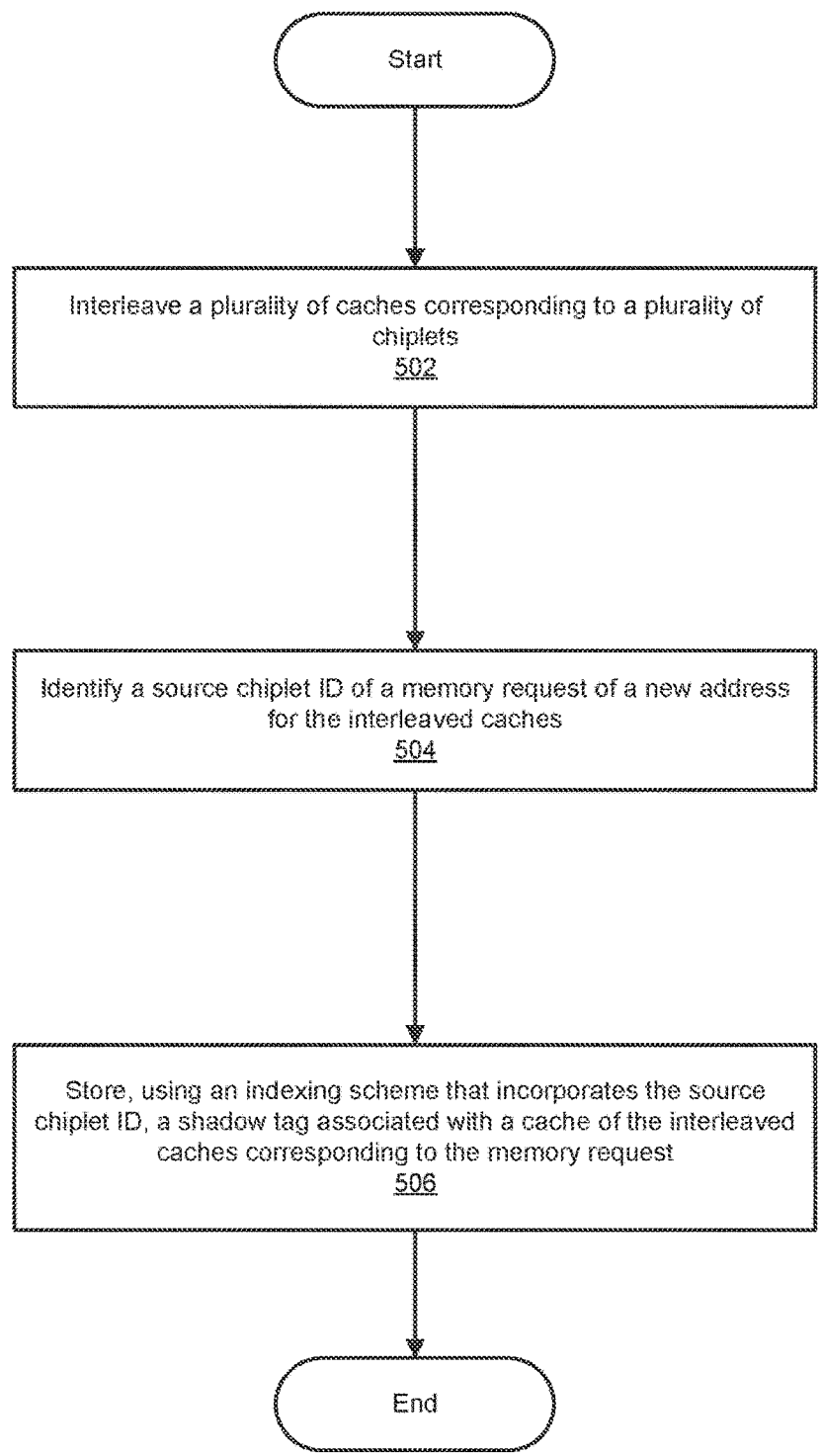
FIG. 5 is a flow diagram of an exemplary method for shadow tag management for accelerator partitions.

FIG. 5 is a flow diagram of an exemplary computer-implemented method 500 for shadow tag management for accelerator partitions. The steps shown in FIG. 5 can be performed by any suitable computer-executable code and/or computing system, including the system(s) illustrated in FIGS. 1 and/or 2. In one example, each of the steps shown in FIG. 5 represent an algorithm whose structure includes and/or is represented by multiple sub-steps, examples of which will be provided in greater detail below.

As illustrated in FIG. 5, at step 502 one or more of the systems described herein interleaves a plurality of caches corresponding to a plurality of chiplets. For example, controller 112 interleaves cache 140A and cache 140B corresponding to interleaving chiplet 130A and chiplet 130B. As described herein, the chiplets can be interleaved in various combinations, with the associated caches being similarly interleaved.

At step 504 one or more of the systems described herein identifies a source chiplet ID of a memory request of a new address for the interleaved caches. For example, controller 112 identifies a source chiplet ID of a memory request of a new address for the interleaved caches. Because a previously loaded address would have an existing shadow tag, controller 112 detects loading new addresses to create new shadow tags.

The systems described herein can perform step 504 in a variety of ways. In one example, the source chiplet ID can include various identifiers of physical structures, such as a channel ID for the interleaved caches, a stack ID for the interleaved caches, and/or a die ID for the interleaved caches.

At step 506 one or more of the systems described herein stores, using an indexing scheme that incorporates the source chiplet ID, a shadow tag associated with a cache of the interleaved caches corresponding to the memory request. For example, controller 112 stores a shadow tag for the cache (of the interleaved caches) that was updated in response to the memory request using the indexing scheme described herein.

The systems described herein can perform step 506 in a variety of ways. In one example, the indexing scheme repurposes one or more address bits based on a number of interleaved caches, as described herein. In some examples, a number of repurposed bits is based on the number of interleaved caches. In some examples, the indexing scheme repurposes at least one static address bit. A number of static address bits can be based on a number of interleaved caches. Further, the number of static address bits can correspond to a number of repurposed bits in some examples. As further described herein, the indexing scheme can incorporate a channel ID for the interleaved caches, a stack ID for the interleaved caches, and/or a die ID for the interleaved caches.

As detailed above, the systems and methods described herein are directed to an updated shadow tag scheme for managing hardware accelerator partitions. Shadow tags are used to track which memory addresses and values have been written to a cache. Modern architectures have multiple hardware accelerator chiplets, each having their own respective cache and able to operate independently. The hardware accelerator chiplets can be interleaved into larger hardware accelerators. This includes interleaving the respective caches, which would require an updated shadow tag management scheme to account for effectively larger caches. The present disclosure provides a shadow tag scheme that can adapt to the interleaved caches without structural changes (e.g., additional bits) by redefining certain address bits using source chiplet IDs.

As detailed above, the computing devices and systems described and/or illustrated herein broadly represent any type or form of computing device or system capable of executing computer-readable instructions, such as those contained within the modules described herein. In their most basic configuration, these computing device(s) each include at least one memory device and at least one physical processor.

In some examples, the term "memory device" generally refers to any type or form of volatile or non-volatile storage device or medium capable of storing data and/or computer-readable instructions. In one example, a memory device stores, loads, and/or maintains one or more of the modules and/or circuits described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor accesses and/or modifies one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), systems on a chip (SoCs), digital signal processors (DSPs), Neural Network Engines (NNEs), accelerators, graphics processing units (GPUs), portions of one or more of the same, variations or combinations of one or more of the same, or any other suitable physical processor.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   interleaving one or more of a plurality of chiplets, each chiplet having a cache, and interleaving the corresponding caches into a larger cache;
   identifying an address of the larger cache to be used with a memory request from one of the plurality of chiplets with a source chiplet ID; and
   storing, using an indexing scheme that repurposes at least one static address bit to incorporate the source chiplet ID, a shadow tag for one of the caches of the larger cache corresponding to the memory request, wherein the shadow tag indicates a memory address associated with the memory request and a state for corresponding data in the one of the caches.

2. The method of claim 1, wherein the indexing scheme repurposes one or more address bits based on a number of interleaved caches.

3. The method of claim 2, wherein a number of repurposed bits is based on the number of interleaved caches.

4. The method of claim 1, wherein a number of static address bits is based on a number of interleaved caches.

5. The method of claim 1, wherein the indexing scheme further incorporates at least one of a channel ID for the interleaved caches, a stack ID for the interleaved caches, or a die ID for the interleaved caches.

6. A device comprising:
   a plurality of chiplets, each chiplet having a cache; and
   a controller configured to:
     interleave the caches corresponding to the plurality of chiplets into a larger cache;
     identify an address of the larger cache to be used with a memory request from one of the plurality of chiplets with a source chiplet ID; and
     store, using an indexing scheme that incorporates the source chiplet ID, a shadow tag associated with one of the caches of the larger cache corresponding to the memory request, wherein the shadow tag indicates a memory address associated with the memory request and a state for corresponding data in the one of the caches.

7. The device of claim 6, wherein the indexing scheme repurposes one or more address bits based on a number of interleaved caches.

8. The device of claim 7, wherein a number of repurposed bits is based on the number of interleaved caches.

9. The device of claim 6, wherein the indexing scheme repurposes at least one static address bit.

10. The device of claim 9, wherein a number of static address bits is based on a number of interleaved caches.

11. The device of claim 10, wherein the number of static address bits corresponds to a number of repurposed bits.

12. The device of claim 6, wherein the indexing scheme further incorporates a channel ID for the interleaved caches.

13. The device of claim 6, wherein the indexing scheme further incorporates a stack ID for the interleaved caches.

14. The device of claim 6, wherein the indexing scheme further incorporates a die ID for the interleaved caches.

15. A system comprising:
   a plurality of chiplets, each chiplet having a cache; and
   a controller configured to:
     interleave one or more of the plurality of chiplets and interleave the corresponding caches into a larger cache;
     identify an address of the larger cache to be used with a memory request from one of the plurality of chiplets with a source chiplet ID; and
     store, using an indexing scheme that repurposes one or more address bits to incorporate the source chiplet ID, a shadow tag for one of the caches of the larger cache corresponding to the memory request, wherein the shadow tag indicates a memory address associated with the memory request and a state for corresponding data in the one of the caches.

16. The system of claim 15, wherein a number of repurposed bits is based on a number of interleaved caches.

17. The system of claim 15, wherein the indexing scheme repurposes at least one static address bit.

18. The system of claim 17, wherein a number of static address bits is based on a number of interleaved caches.

19. The system of claim 18, wherein the number of static address bits corresponds to a number of repurposed bits.

20. The system of claim 15, wherein the indexing scheme further incorporates at least one of a channel ID for the interleaved caches, a stack ID for the interleaved caches, or a die ID for the interleaved caches.

* * * * *